(No Model.)
D. GRUBB.
COMBINED BAND CUTTER AND FEEDER FOR THRASHING MACHINES.
No. 310,417. Patented Jan. 6, 1885.
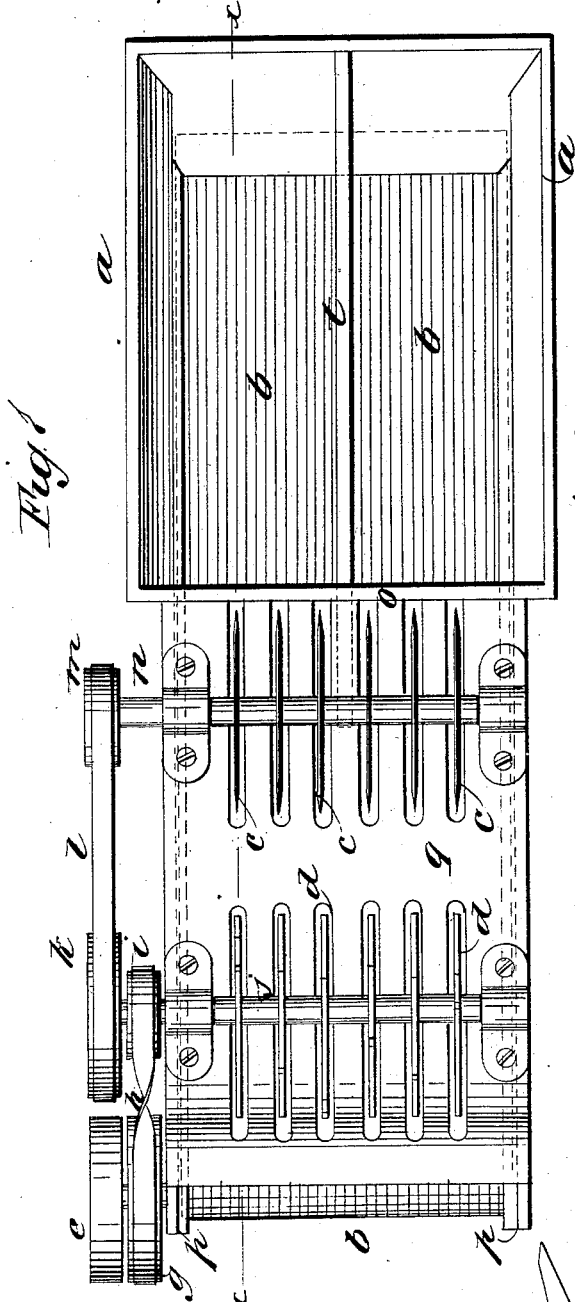
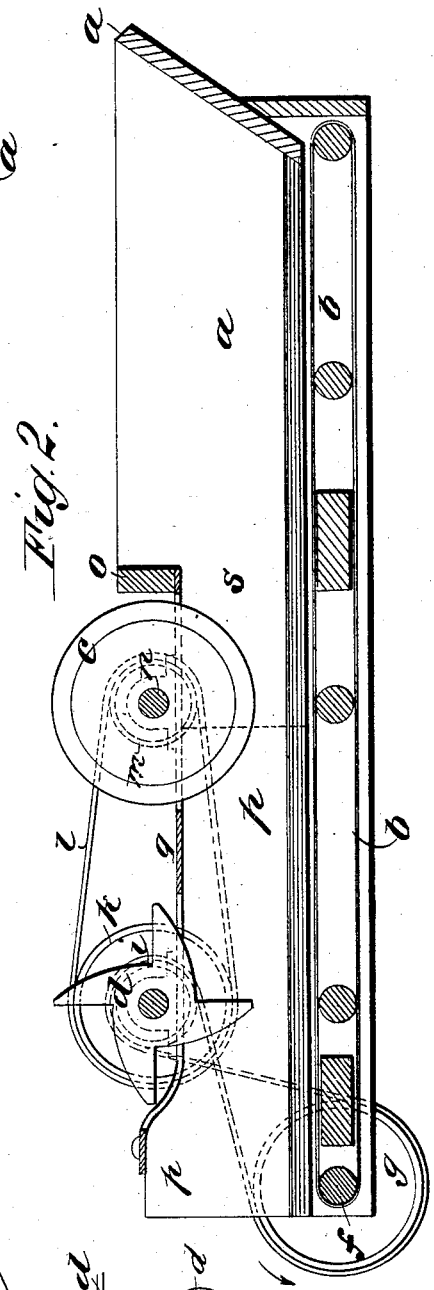
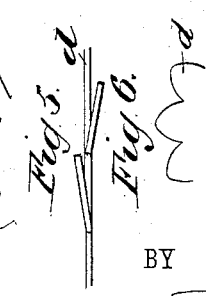
WITNESSES:
F. McArdle
C. Sedgwick
INVENTOR:
D. Grubb
BY Munn & Co.
ATTORNEYS.

UNITED STATES PATENT OFFICE.

DAVID GRUBB, OF WALDRON, INDIANA.

COMBINED BAND-CUTTER AND FEEDER FOR THRASHING-MACHINES.

SPECIFICATION forming part of Letters Patent No. 310,417, dated January 6, 1885.

Application filed March 28, 1884. (No model.)

*To all whom it may concern:*

Be it known that I, DAVID GRUBB, of Waldron, in the county of Shelby and State of Indiana, have invented a new and Improved Band-Cutter and Feeder for Thrashing-Machines, of which the following is a full, clear, and exact description.

My invention consists of improvements in some of the devices and arrangements of the same, comprising a feed-hopper, endless carrier, rotary band-cutters, and toothed rotary spreading and feeding wheels employed for cutting the bands of grain-sheaves and feeding them to the thrashing-cylinders, all as hereinafter fully described, and specifically set forth in the claim.

Reference is to be had to the accompanying drawings, forming part of this specification, in which similar letters of reference indicate corresponding parts in all the figures.

Figure 1 is a plan view of my improved combined band-cutter and feeder. Fig. 2 is a longitudinal sectional elevation of the same on the line $x\ x$ of Fig. 1. Figs. 3, 4, and 6 are details of different forms of feeding-wheels; and Fig. 5 is a front elevation of Fig. 4.

The said combined band-cutter and feeder consists of the hopper $a$, in which the sheaves are placed to be delivered on an endless apron, $b$, to be conveyed to the thrashing-cylinder. (not shown,) rotary band-cutting disks $c$, and the rotary toothed wheels $d$, for spreading, stirring, and delivering the grain to the thrashing-cylinder, together with driving-gear for operating the carrier, cutters, and feeders, which I propose to arrange by fixing a driving-pulley, $e$, on the carrier-roller $f$ at the delivery end of the apron, to be driven by a belt from any available pulley on the thrashing-machine, with another pulley, $g$, on said shaft, from which a crossed belt, $h$, runs onto a smaller pulley, $i$, on the shaft $j$, carrying the feed-wheels $d$, and shaft $j$ also has a larger pulley, $k$, from which a belt, $l$, runs to the pulley $m$ on the shaft $n$, carrying the cutters $c$. I arrange these cutters $c$ a suitable distance above the apron $b$, to enable said cutters to run deep enough in the sheaves to insure cutting of the bands as the sheaves are carried under them by the apron, said cutters being located directly in front of the end $o$ of the hopper and between the sides $p$ of the way along which the apron runs to convey the grain to the thrasher. The feed-wheels $d$ are similarly located between the sides $p$ of the hopper at a suitable distance along the feedway from the cutters, and from the end of the way where the grain is delivered; and directly under the shafts of the cutters and feeders I have arranged a slotted guard-plate, $q$, which extends beyond the cutters and feeders a suitable distance each way, and next to the hopper connects with the end $o$ of the same above the opening $s$, through which the grain is carried out of the hopper, so that the straw cannot rise up to and wind around the cutter-shafts as when said shafts are exposed to the grain.

I make a central longitudinal partition, $t$, in the hopper, for the purpose of spreading the grain by effecting better separation of the sheaves placed side by side in it by preventing them from crowding to one side or the other, as they sometimes do without such a partition. The partition also insures the placing of the sheaves in the right direction.

The cutters consist of circular disks with sharp edges to be pressed down in the sheaves, so as to insure the cutting of the bands; but the feeders are required to have prongs or teeth by which to spread the grain and distribute it, and these may be made in different forms, as with the backwardly-curved front edges, as in Fig. 2, or with the reversely-curved edges, as in Fig. 6, or with forwardly-inclined straight edges, Figs. 4 and 5, or the saw-tooth form of Fig. 3; and the prongs or teeth may be set laterally like saw-teeth, as represented in Fig. 5, if preferred.

In practice the endless apron $b$ will be provided with slats or bars arranged crosswise, as usual in such carriers.

The cutters $c$ and feeders $d$ are arranged in series along their respective shafts at such distance apart as will insure effective action.

Having thus fully described my invention, I claim as new and desire to secure by Letters Patent—

The combination, with the hopper $a$, open at its top and bottom, and the endless apron $b$, forming the bottom of the same, of the guard $q$, formed with two series of slots, as shown, and extending over and secured to the sides of the hopper, a series of cutting-disks, $c$, and a series of toothed feed-wheels, $d$, mounted on shafts $j$ $n$ above the guard-plate $q$, and extending through the slots therein, whereby the straw is prevented from being wound around the journals of the cutters and feed-wheels, and a feedway is formed between the said guard, endless belt, and sides of the hopper, substantially as set forth.

DAVID GRUBB.

Witnesses:
ALFRED CHAPMAN,
WILL. T. LARIMORE.